Oct. 14, 1952   R. W. DONALDSON   2,614,180
CURRENT COLLECTOR HEAD
Original Filed Feb. 18, 1949

INVENTOR.
RAYMOND W. DONALDSON
BY
attorney.

Patented Oct. 14, 1952

2,614,180

UNITED STATES PATENT OFFICE 2,614,180

CURRENT COLLECTOR HEAD

Raymond W. Donaldson, Lexington, Ohio, assignor to The Ohio Brass Company, Mansfield, Ohio, a corporation of New Jersey Original application February 18, 1949, Serial No. 77,208. Divided and this application July 16, 1949, Serial No. 105,110

8 Claims. (Cl. 191—38)

My invention relates to the operation of electrically operated vehicles of the trolley bus type and the trolley frogs or switches for guiding the current collectors mounted on the bus as it moves along the desired path at a turn-out point.

This invention has particular reference to one of the parts which performs a very important function in the operation and control of the frogs as later explained.

This application is a division of my copending application Serial Number 77,208 filed February 18, 1949.

Figure 1:
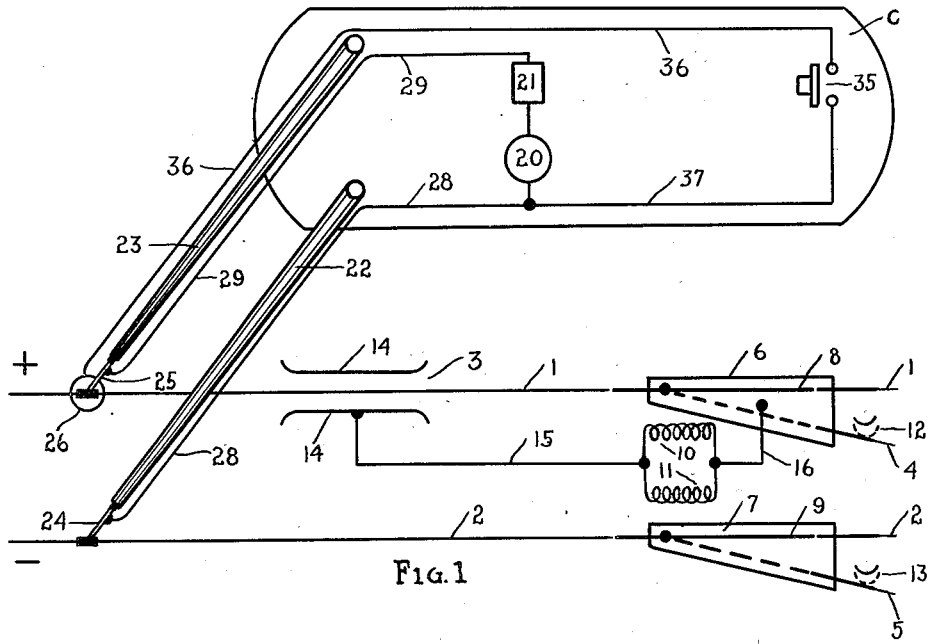

The simplest form of my improved system is disclosed schematically in Fig. 1.

The overhead system now in general use for controlling the movement of the current collectors at a straight-away and turn-out point is disclosed in U. S. Patent 2,264,839 and requires two or three staggered contact members associated with a pair of trolley wires in advance of the frogs.

For a better understanding of the bus system in which the part later described and claimed in this application, the system employs two parallel trolley wires, a positive and a negative and the vehicle, since it does not follow a definite path, as does a street car operating on a track, the bus may wander from side to side of the street, sometimes parallel to the trolley wires, below or to one side of the same or the vehicle may move at an angle to the trolley wires.

In order to properly control the operation of the frogs to properly direct the movement of the current collectors therethrough, depending upon whether the vehicle is to move straight through or make a turn, the operator of the vehicle must so maneuver the same that the current collectors will properly engage the contact members which aid in the control of the frog tongues.

Some systems employ a type of frog in which the tongue is operated in each direction by separate solenoids or coils and other systems used a frog in which the tongue is operated electrically to one position and mechanically to the other position and is termed a resetting type of frog. It is this latter type which I employ.

So long as the vehicle operator is able to successfully maneuver the vehicle so as to properly engage or avoid engaging the two or more contact members, to properly set the frog tongues the present system of control is satisfactory.

But it requires careful and skillful maneuvering to guide the coach through traffic and position the vehicle so that the current collector will engage the contact members for proper operation of the frogs.

The object of my improved system is to provide one which is simple and does not require the close and exacting maneuvering of the vehicle when desiring to make a turn and to accomplish this I employ a special form of current collector head which is combined with a connector ring and which head is the main object of this application, in fact only one contact member is required.

Due to the manner in which the bus travels with respect to the overhead trolley wires it is necessary to employ a special trolley head or collector differing materially from that required by street cars.

Figures 2, 3:
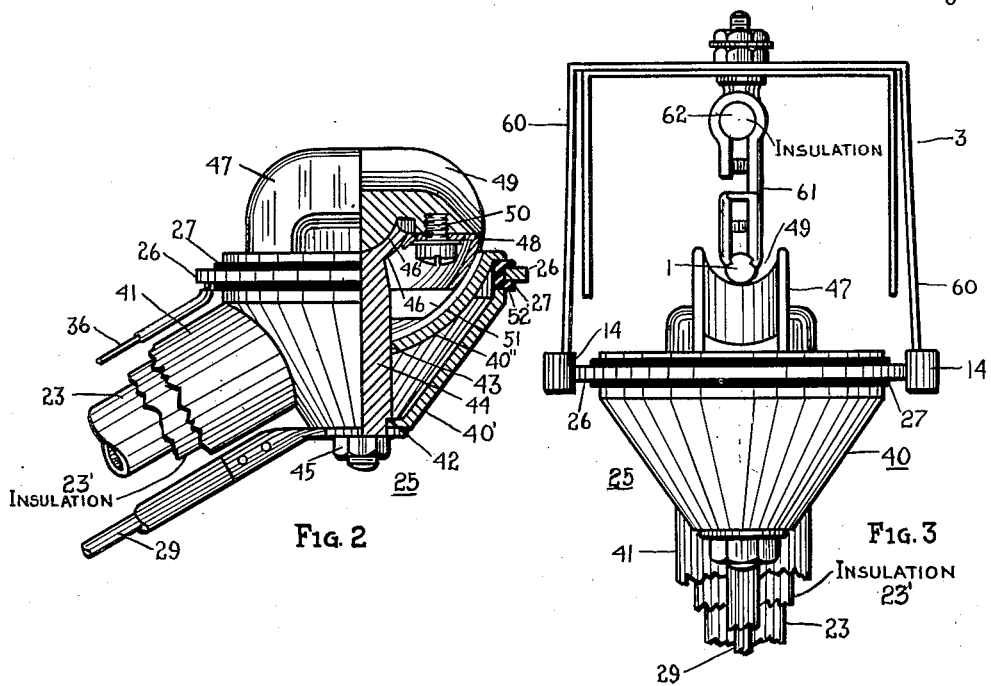

My invention is disclosed in the description which follows and its manner of use is shown schematically in the attached drawing Figs. 1 and 3.

In Fig. 2 is shown in partial section a side view of the current collector head I employ in my improved system and in Fig. 3 is shown an end view of a contactor such as shown in U. S. Patent 2,195,734 and Fig. 3 also shows the relation between my improved current collector head and the contactor as it passes through the contactor.

A description of Fig. 1 will disclose the reason for my improved current collector.

In Fig. 1, the main trolley wires, positive and negative, are indicated as 1 and 2 respectively. The contactor 3 is mounted on one of the trolley wires and the contact elements or blades are insulated from the trolley wire 1.

Branch wires 4 and 5 lead from the main wires 1 and 2 respectively and at each junction thereof is positioned a trolley frog 6 or 7 respectively. The frogs shown are of the reset type as previously stated and shown and described in U. S. Patent 2,299,914, that is the frogs each have a tongue 8 or 9 respectively normally set for straight through or main line operation and when the tongue has been actuated, for instance, to guide the current collector onto the branch wire, the tongue is reset mechanically to its normal straight line position by the collector before it clears the frog.

Each frog requires only one operating coil, 10 or 11 respectively, and while they are shown as connected in parallel they may be connected in series and each coil is mounted on its respective switch to operate the tongue to the turn-out position and the tongue is returned to its straight through or normal position when the current collector engages the trip 12 or 13 respectively which connects mechanically with the tongue (see Patent 2,299,914).

The contactor blades 14 are normally insulated from the trolley wire 1 and are connected by conductor 15 to coils 10 and 11 and each coil in turn is connected by the conductor 16 to the pan of the switch 6 which is energized and of the same polarity as trolley wire 1.

The trolley coach or vehicle C is provided with a motor 20 and controller 21 therefor, and on the roof of the vehicle are pivotally mounted two trolley poles 22 and 23 as is usual practice.

The trolley pole 22 is provided at its upper end with a current collector head 24 (Fig. 1) and the pole 23 is equipped with a current collector head 25 (Figs. 1, 2, 3) which is a modification of the head 24 by the inclusion of connecting means 26 shown as a metal ring which surrounds the collector head in insulated relation thereto by the interposed insulating member 27.

The controller 21 and motor 20 are shown as connected in series while the conductor 28 connects the current collector of head 24 to one side of the motor and the conductor 29 connects the current collector of head 25 to one side of the controller thus the motor is connected to the positive and negative trolley wires with the controller interposed.

As the vehicle moves along toward the frogs 6 and 7 the collector head 25 will enter the contactor 3 and the connecting means 26 will engage the contactor blades 14 (see Fig. 3).

When the collector head 25 is associated with the contactor 3, the trolley pole 23 may be traveling directly below in alignment with or at a lateral angle to the trolley wire hence for this reason the head 25 must be different from the head 24 so that it will properly cooperate with the contactor throughout its travel through the contactor.

When the normally open manually operable control switch 35 is closed with the connecting means 26 of the current collector 25 engaging the contactor blades 14, current will flow from the positive trolley wire 1 or frog 6 through conductor 16, coils 10 and 11, conductor 15, blades 14, connecting means 26, conductor 36, switch 35, conductors 37 and 28, and collector head 24 to the negative trolley wire 2.

When the switch 35 is closed and the connecting means 26 of collector head 25 engages the contactor 3 the frog tongues will be moved to their branch or turn-out position but if the switch 35 is not closed then the frog tongues will remain in their straight through position.

When the switch 35 is closed and the current collector head is about to engage the contactor 3 the connecting means 26 will have an opposite polarity to that of the shoe or associated trolley wire 1.

The collector head 25 is provided with supporting means comprising a bowl shaped member 40 constructed preferably of sheet metal with an outer portion 40' and an inner portion 40", and a socket member 41 projecting therefrom to receive the end of the trolley pole 23 with an interposed sleeve 23' of insulation, preferably resilient rubber, to absorb vibrations as well as to electrically insulate.

The bowl-shaped member 40 has two registering openings, 42 and 43 through which extend the substantially upright supporting pin 44 held securely in place by the nut 45 and having a flaring bearing 46 with a spherical cup shaped bearing surface 46' and an outer spherical bearing surface parallel to that of 46'.

The current collector portion of the head 25 has two parts namely the shoe 47 and the retaining part 48, both of metal. The shoe 47 is provided with a groove 49 to receive the trolley wire and guide the collector head along the trolley wire. The shoe is also provided with a spherical bearing surface engaging with and conforming to the spherical bearing surface 46' on the bearing 46.

Since the shoe 47 must move along parallel to and in contact with the trolley wire and since the pole 23 with the attached parts 40 and 41 take various positions relative to the trolley wire 1, it is necessary that the shoe 47 and its retaining portion 48 shall pivot relative to the parts 40, 41 and 44, hence the spherical construction described above.

The shoe 47 is held in place by the retaining portion 48 which engages the lower face of the bearing portion 46 and is held to the shoe 47 by screws 50, thus permitting replacement of the shoe when necessary from wear.

Another relative movement is necessary between the current collector or shoe 47 and its supporting parts 40, 41 and 44 namely a relative movement in a vertical plane to compensate for varying height of the trolley wire and inequalities in the overhead met by the bus as it travels along its way. This movement is secured through the medium of the slot 51 in the retaining part 48 and through which slot the pin 44 extends.

The above construction of the head permits the shoe or current collector 47 and retainer 48 to rotate upon the pin 44 in a plane at right angles or substantially so to the axis of the pin 44 and the slot 51 permits the shoe and retainer to pivot in a plane coinciding with the longitudinal axis of the pin. The screw 50 may be manipulated through the slot 51.

The bowl shaped portion 40 is provided with a circumferential groove 52 in which the metal ring like member 26 which is secured with interposed insulation 27 and in laterally spaced relation to the pin 44. The construction and assembly of the ring 26 and the insulation 27 is such that they are secured in fixed relation to the member 40 through friction or pressure against the faces of the groove 52 and will move with the bowl member 40 and will not endanger the overhead construction should a diwirement occur and the exposed peripheral surface of the ring will engage the contactor blades 14 as the collector head passes through the contactor regardless of the pole angle.

The conductor 29 connects to the bowl shaped portion 40 and the insulated conductor 36 connects to the ring 26.

This construction of the collector head 25 permits the trolley bus to have a wide latitude of operation relative to the trolley wires. The head 24 is the same as the head 25 with the connecting means 26 omitted.

If the polarity of the connecting means 26 should be the same as that of the bowl shaped portion 40 or the collector 47, the insulation 27 will still be necessary, and the connecting means will engage the blades 14 regardless of the relative positions as described above of the pole 23 and contactor 3 as the collector head passes through the contactor but the conductor 16 must connect electrically to trolley wire 2.

The elongated members 14 of the contactor 3 are mounted by means of springs 60 which assure contact with the connecting means 26 and which are suspended in insulated relation to the trolley clamp 61 by the insulating rod 62.

The clamps 61 (two or more in number) grip the trolley wire 1 thus supporting the contactor 3 which is also disclosed in U. S. Patent 2,195,734. The vertical height of the members 14 may be made such as necessary for engagement by the connecting member to meet operating conditions.

By making the connector 26 insulated from the head it is possible to control the operation of the frogs through the manipulation of the switch 35, and while I have referred to the connecting means 26 as a ring at substantially right angles to the axis of the pin 44 or substantially horizontal, it may only partly encircle the head that is, only sufficiently to insure contact with the blades 14 at any practical operating angle which the pole may make to the trolley wire while passing the contactor 3.

If the connecting means 26 and insulation 27 entirely surround the support, they may be split and sprung into place in the circumferential groove 52 and the adjacent ends of the connecting means 26 then soldered or brazed together thus securing the connecting means in fixed relation to the head.

Modifications will suggest themselves based on my herein disclosure, therefore I wish to be limited only by my claims.

I claim:
1. In a current collector head comprising a metallic support member and a current collector, the support member provided with projecting means to secure it to a trolley pole and upstanding support means on which the current collector is mounted to pivot thereon in substantially vertical and horizontal planes relative to the support member, the support member provided with recessed means in a plane above the projecting means and concentric with the support member, the combination with the said support member of metallic connecting means mounted in the recessed means in concentric relation to the current collector and to the upstanding support means therefor, the connecting means projecting laterally from the support member and having a plurality of exposed surfaces, insulating means interposed between the connecting means and the support member, the connecting means and the insulating means and the support member being so constructed and arranged that the plane of one exposed surface of the connecting means will be substantially normal to the upstanding support means and the other exposed surface being substantially parallel to the axis of the upstanding support means, and the connecting means secured in fixed relation to the support member and movable relative to the current collector.

2. In a current collector head for a trolley bus system comprising metallic supporting means and a current collector, the supporting means provided with a portion adapted to secure it to a trolley pole and upstanding support means upon which a current collector is mounted and a retaining means to secure the current collector in pivotal relation to the upstanding support means, the combination with the first said support means of metallic connecting means projecting laterally from the first said supporting means and arranged to engage a contactor and surround the current collector to a predetermined extent in concentric relation thereto, the connecting means having a plurality of exposed surfaces, the plane of one of the surfaces of the connecting means being substantially parallel to the upstanding support means and the plane of the other exposed surfaces being substantially normal to the axis of the upstanding support means, insulating means interposed between the connecting means and the supporting means, the current collector and connecting means and the supporting means being so constructed and arranged that the connecting means will engage the contactor as the trolley bus moves parallel to or angling to the trolley wire in lateral relation thereto.

3. A current collecting head comprising, a cup or bowl shaped support provided with means to secure the support to a trolley pole, a current collector with a groove adapted to receive a trolley wire and guide the head along the wire, the current collector mounted on the support by a universal joint whereby the current collector and support are movable relative to each other, metallic connecting means secured to and encircling the support in fixed and concentric relation thereto, insulating means interposed between the support and the connecting means to insulate the connecting means from the current collector and from the support, a portion of the connecting means projecting laterally from the support and from the insulating means and having an exposed surface adapted to engage a contactor associated with the trolley wire.

4. A current collector head comprising, a bowl-shaped support means with projecting means to receive the end of a trolley pole for support of the head, a current collector mounted on the support and having a groove to receive a trolley wire and guide the head along the trolley wire, a universal joint securing the current collector to the support means whereby the current collector may oscillate and rotate simultaneously relative to the support means in opposing planes, the bowl-shaped support means formed with an outwardly opening circumferential groove adjacent its upper edge, annular shaped metallic connecting means secured in the groove in fixed relation to the support means with interposed insulation and projecting radially outwardly through said opening of the circumferential groove from the adjacent surface of the support, the connecting means provided with an exposed contact surface.

5. A current collector head comprising, a cup-shaped support member with means to secure the member to a support, a second support member comprising an upright member secured to the cup-shaped support member central thereof, a current collector mounted on the second support member and having a connection therewith to provide universal movable relation with the support member, connecting means associated with the cup-shaped support member, recessed means opening outwardly associated with the cup-shaped member and encircling the upright member, the connecting means positioned within the recessed means with insulating means interposed between the cup-shaped support member and the connecting means, the connecting means encircling the upright member and projecting from the cup-shaped support member, the plane of the recessed means and of the connecting means being substantially at right angles to the longitudinal axis of the said second support.

6. A current collecting head comprising, a bowl-shaped support member with means to receive means to mount the member on a vehicle, a second support central of the bowl-shaped support, a grooved current collector mounted on the second support by universal joint means whereby the head is guided along a trolley wire, connecting means secured to the bowl-shaped support member in circumferential and concentric relation to the current collector, the plane of the connecting means being substantially normal to the axis of the second supporting member and parallel to the plane of the rim of the bowl-shaped support member, and insulating means interposed between the connecting means and the bowl-shaped member.

7. A current collector head as set forth in claim 6 in which the insulating means is U-shaped in cross-section and projects from the adjacent surface of the support member but to a less extent than the connecting means projects.

8. A current collector head comprising, a support member, means projecting from the support member to receive means to mount the head on a vehicle, a second support positioned central of the said support member, a grooved current collector mounted on the second support by universal joint means, connecting means secured to the said support member in circumferential and concentric relation to the current collector, and having an annular contact surface substantially parallel to the axis of the second support to engage an overhead contactor, the plane of the connecting means being substantially normal to the axis of the second support and movable with the support member and independently of the current collector, the universal joint means being so constructed that the current collector pivots in a plane coinciding with the axis of the second support and in a plane substantially normal to the plane of the connecting means and the current collector also rotates in a plane substantially normal to the axis of the second support and parallel to the plane of the connecting means, whereby the current collector head will follow the trolley wire while passing an overhead contactor and the connecting means will engage the contactor when the vehicle, in passing the contactor, moves either parallel to or angling to the trolley wire in lateral relation thereto.

RAYMOND W. DONALDSON.

REFERENCES CITED

The following references are of record in the file of this patent:

UNITED STATES PATENTS

| Number | Name | Date |
|---|---|---|
| 747,795 | Stewart et al. | Dec. 22, 1903 |
| 851,975 | Beaudette | Apr. 30, 1907 |
| 913,168 | Roth | Feb. 23, 1909 |
| 954,014 | Bayley | Apr. 5, 1910 |
| 1,396,690 | Mikulic | Nov. 8, 1921 |
| 1,893,383 | Way | Jan. 3, 1933 |
| 2,005,908 | Schaake | June 25, 1935 |
| 2,326,065 | Rideout | Aug. 3, 1943 |

FOREIGN PATENTS

| Number | Country | Date |
|---|---|---|
| 317,650 | Italy | Mar. 18, 1934 |